United States Patent
Kissig et al.

(10) Patent No.: US 11,095,943 B1
(45) Date of Patent: Aug. 17, 2021

(54) SYSTEM AND METHOD FOR MANAGEMENT OF PERSONALIZATION CONTENT

(71) Applicant: Amazon Technologies, Inc., Seattle, WA (US)

(72) Inventors: Christian Kissig, Canterbury (GB); Conor Malachy McDonald, London (GB); Daniel Peters, Hove (GB); Matthew William van Buuren, London (GB); Benjamin Ward, Chelmsford (GB)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/452,194

(22) Filed: Jun. 25, 2019

(51) Int. Cl.
  *H04N 21/458* (2011.01)
  *G06N 3/04* (2006.01)
  *H04N 21/485* (2011.01)
  *H04N 21/466* (2011.01)
  *G06N 20/20* (2019.01)

(52) U.S. Cl.
  CPC ......... *H04N 21/458* (2013.01); *G06N 3/0445* (2013.01); *G06N 20/20* (2019.01); *H04N 21/466* (2013.01); *H04N 21/4858* (2013.01)

(58) Field of Classification Search
  CPC .............. H04N 21/458; H04N 21/466; H04N 21/4858; G06N 20/20; G06N 3/0445
  See application file for complete search history.

(56) References Cited

U.S. PATENT DOCUMENTS

| | | | |
|---|---|---|---|
| 2008/0066185 A1* | 3/2008 | Lester | G06F 21/6209 726/27 |
| 2014/0098850 A1* | 4/2014 | Wolfram | H04N 21/8352 375/240.02 |
| 2017/0243120 A1* | 8/2017 | Doan | G06F 40/30 |
| 2017/0308960 A1* | 10/2017 | Mascaro | G06N 20/20 |

\* cited by examiner

*Primary Examiner* — Nasser M Goodarzi
*Assistant Examiner* — Adil Ocak
(74) *Attorney, Agent, or Firm* — Knobbe, Martens, Olson & Bear, LLP

(57) ABSTRACT

The disclosure herein pertains to a system and method for management of personalization content. The system and method divide the personalization information into offline personalization information and situational personalization information. Offline personalization information is independent of context and predetermined before a content request. A personalization model can dynamically allocate the selection between offline personalization information and situational personalization information.

23 Claims, 5 Drawing Sheets

SYSTEM AND METHOD FOR MANAGEMENT OF PERSONALIZATION CONTENT

BACKGROUND

Generally described, computing devices and communication networks can be utilized to exchange data and/or information. In a common application, a computing device can request content from another computing device via the communication network. For example, a user at a personal computing device can utilize a network-enabled application, such as a browser application, to request a content page (e.g., a network page, a Web page, etc.) from a server computing device via the network (e.g., the Internet). In such embodiments, the user computing device can be referred to as a client computing device and the server computing device can be referred to as a content provider.

In an effort to deliver users a more personalized experience, e.g., to recommend content in which the user may have an interest, content providers often will respond to requests for content from client computing devices by attempting to provide some form of personalization or personalized content before delivery to the client computing device. Such personalization information generally corresponds to information that pertains to a user, and that the user consents to sharing, that can be used to modify content provided by a content provider. For example, content can be customized (e.g., modified) to include specific information associated with an identified user, such as name, location, etc. In another example, the content provider can select different content or order the presentation of content based on information associated with an identified user.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
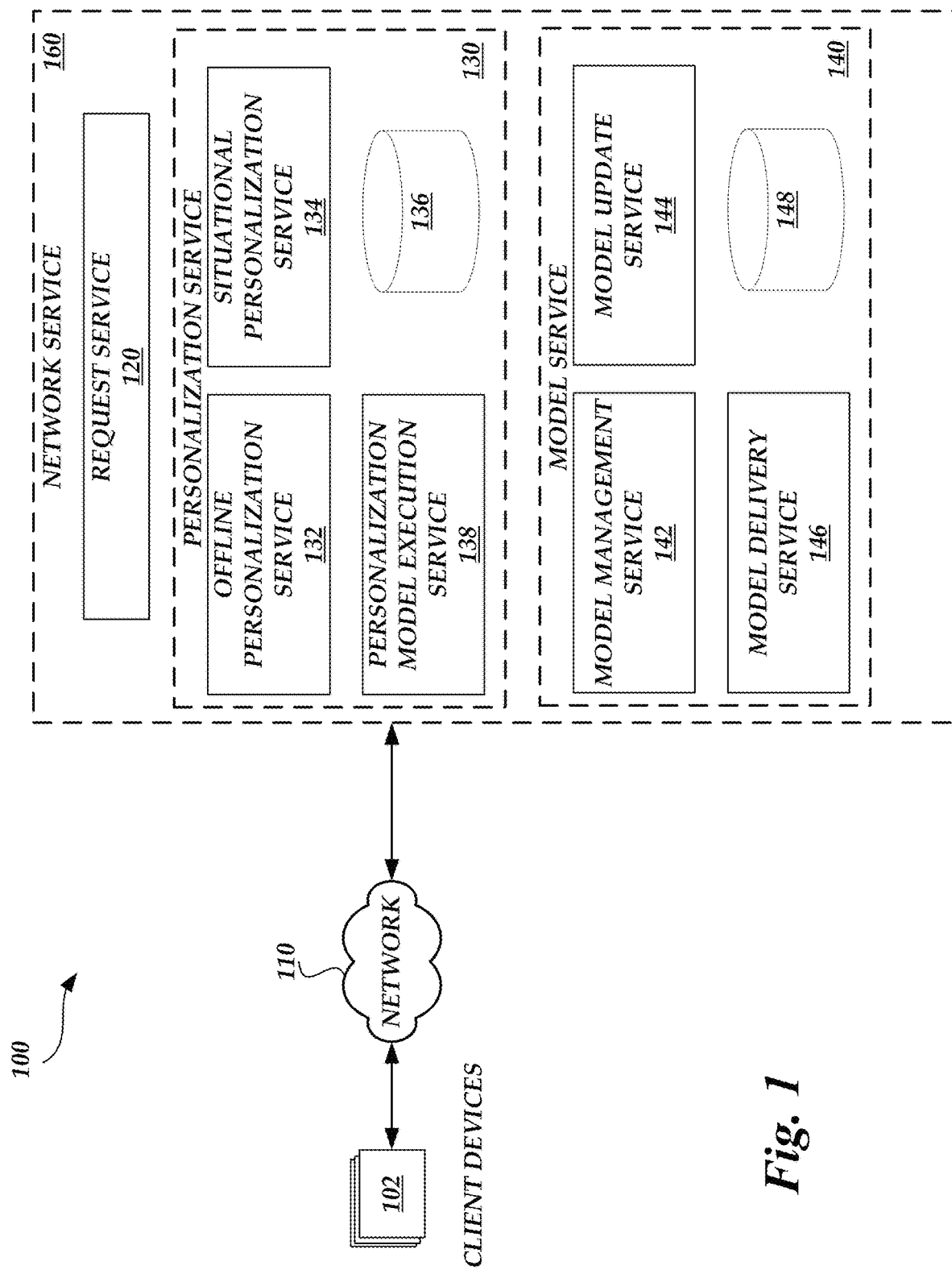
FIG. 1 is a block diagram of a content personalization environment that includes one or more client devices, a request service, a personalization service, a model service, and a content delivery service according to one embodiment.

Generally described, aspects of the present application correspond to the exchange of content between content providers and client computing devices. More specifically, aspects of the present application correspond to processing content requests to include personalized content that has been previously processed prior to receipt of the content requests. Illustratively, a content delivery service provider can determine a set of personalized content for an identified entity, such as a consenting user, prior to receiving requests for content, generally referred to as offline personalization content. The content delivery service provider further includes the ability to determine context information associated with content requests that includes one or more dynamic parameters and information. The context information can illustratively be used to obtain additional personalization content that is dependent, at least in part, on the context information, generally referred to as situational personalization information.

Still further, the content delivery service provider maintains personalization models to define logic forming as set of personalized content utilizing a selection from available offline personalization content and dynamically determined situational personalization information. Responsive to content requests that can require personalization information, the content delivery service evaluates the personalization model to select from offline personalization information. Based on the selected offline personalization information, the content delivery service can further identify situational personalization information corresponding to the context information associated with the individual requests. The situational personalization information can illustratively be considered a function of the selected offline personalization information.

Generally described, some prior approaches to content delivery services required the content delivery service provider to dynamically determine personalization information responsive to content requests. More specifically, such prior approaches to content delivery services attempted to collect and determine all available personalization information at runtime. Accordingly, generating personalization information would generally result in processing and network latencies to generate a full set of responsive personalization information.

In some implementations, content delivery services would further limit the amount of personalization information that would be generated to attempt to avoid or mitigate processing latencies. For example, traditional implementations of content delivery service would be more limited in the ability to provide individualized personalization, such as for individuals, based on performance limitations to the content delivery service. In another example, other content delivery services may utilize user profile information to customize user interface controls based on specific user preferences. In this regard, personalization can generally be limited to implementation of an entity specified modification while personalization can apply to modification of content based on aspects/attributes selected by the content delivery service or other service provider.

In still further implementations, content delivery services can attempt to implement content personalization to an entire "offline" framework in which the personalization information is exclusively maintained. For example, one approach includes caching individual user social media data that is utilized to personalize application interfaces without utilizing network bandwidth to collect the social media information at the time the application interface is generated. Such strictly offline approaches can be deficient, however, in limiting the amount of information that is utilized to generate personalized content and in not considering any form of contextual information in the determination of the personalized content.

To address the deficiencies identified above, at least in part, one or more aspects of the present application correspond to a system and method for management of personalized content. One illustrative embodiment disclosed herein is a system for management of personalization content. The system includes one or more client devices that transmit content requests. The content requests include an entity identifier and context information identifying one or more situational criteria for evaluation. The one or more client devices sends the content requests to a request service. By way of illustrative example, the context information can include timing information, event information, system information, location information, or other identifiers that can be utilized to obtain additional context information. As will be described in greater detail below, situational personalization information can be dependent on context information.

The request service transmits a personalization request to a personalization service to provide personalization information related to the content request. The request service can identify specific types of personalization information, such as personalization of returned content, display attributes of the content (e.g., color, size, font, etc.), keywords or selection criteria for supplemental advertisements, ordering or priority information for returned content, filtering information for removing undesired content, and the like. Responsive to the personalization request, the personalization service will attempt to provide the requested personalization content based on a selection from both offline personalization information and situational personalization information.

Generally described, offline personalization information can be determined prior to the receipt of the content request and can be determined without requiring dependence on context information. Offline personalization information is determined apriori and generally requires minimal runtime processing to be available to the personalization service. The offline personalization information can include customer or business information that is completely independent of runtime or real-time context information (e.g., personalization information based on an individual's home region is not dependent on weather). In other embodiments, the offline personalization information can include information that may have some dependency on context information but is processed in a manner in which the dependency is ignored or otherwise assumed (e.g., personalization information that may be partially dependent on whether can be calculated based on average temperature for the month). The offline personalization information is considered to be predetermined or precomputed based on offline context information or other criteria that can be determined in advance or estimated in advance as described herein. Illustratively, situational personalization information corresponds to personalization information that is dependent, at least in part, on runtime or real-time context information and therefore is generally dynamically determined at the time of receipt of the personalization request (e.g., user content personalization information that is dependent on time of day). In some embodiments, the personalization service attempts to minimize situational personalization information to increase performance and availability of personalization information.

To select from available offline personalization information and situational personalization information, the personalization service utilizes a personalization model that provides selection logic or other mechanisms that facilitate the formation of a set of personalization information from offline personalization information and situational personalization information. The personalization model can illustratively be unique to the entity identifier that is included in the content request and facilitates individualized processing of personalization requests. Illustratively, the entity identifier can correspond to individuals, accounts, individual computing devices (e.g., MAC address), individual software application (browsers cookies or application tokens), network addresses, and additional/alternative identifiers.

The personalization service executes the personalization model according to the current context information to dynamically select from at least one of the offline personalization information and the situational personalization information. The execution of the personalization model is responsive to a specific entity identifier (e.g., a user identifier) and context information. More specifically, the personalization model processes the current context information and dynamically allocates a selection of offline personalization information that will be utilized and situational personalization information that will be subsequently calculated. The personalization model can be dynamically evaluated to describe quantitatively and qualitatively how offline personalization information and situational personalization information will contribute to form requested personalization information. The personalization model can be one or more weighted decision trees and/or one or more neural networks which can be used to determine the offline personalization information and the situation personalization information that will be responsive to a specific entity identifier and context information. Illustratively, the personalization models may be encoded in a variety of executable formats that can be evaluated to identify personalization information formed from the offline personalization information and situational personalization information. For example, the personalization model in the form of a weighted decision tree may be encoded according to one of a variety of programming languages, such as JSON, XML, binary, CSV, or other programming languages or computer-readable instructions. In another example, the personalization model in form of a neural network may be encoded with metadata or other configuration information that facilitates the execution of the neural network to generate the processing results. In both embodiments, the personalization model may be implemented in accordance with a set of components that facilitate the execution of the personalization model, such as interpreters, compilers, virtual machine instances, hardware components, and the like. Other forms of machine learning or decision making algorithms, including combination of such models, could also be implemented in accordance with aspects of the present application. In that regard, the allocation of offline personalization information and situational personalization information that forms a set of responsive content can vary among different entity identifiers and for an identified entity identifier based on varied context information.

Advantageously, the amount of run time processing is reduced due to the offline personalization information being predetermined rather than determined at run time. Additionally, in other aspects, the personalization model does not require any limitation as to the features utilized for personalization. Still further, the personalization model can represent a dynamic allocation/selection of the personalization content that can be unique to an identifiable entity and not fixed for different types of contextual information.

One or more aspects of the present application will be described with regard to content requests, such as requests for video data or other streaming content. However, such illustrative example should not be construed as limiting and aspects of the present application can correspond to a number of different embodiments and environments. By way of illustration, the content delivery system may be used for but is not limited to streaming media, serving advertisements, and/or displaying webpages. Media includes but is not limited to music, videos, print media, television, movies, books, radio, publications, social media, messages, blogposts, games, and/or graphics. Still further, while aspects of the present application will be described with regard to specific example personalization information and contextual information, such information is illustrative in nature.

FIG. 1 illustrates a content delivery environment 100 for delivering personalized content to one or more client devices 102. The content delivery environment 100 includes a plurality of client devices 102 utilized by individual users, generally referred to as client computing devices, to request content. For example, with reference to a content streaming application, the client devices 102 may be configured to request streaming or download content from a request service 120, a service provider, such as a content request service or request service.

Client devices 102 may include any number of different computing device capable of communicating with the network 110 via a direct connection or via an intermediary. For example, an individual accessing computing devices may correspond to a laptop or tablet computer, personal computer, wearable computer, server, personal digital assistant (PDA), hybrid PDA/mobile phone, mobile phone, electronic book reader, set-top box, camera, appliance (e.g., a thermostat or refrigerator), controller, digital media player, watch, glasses, a home or car device, Internet of Thing ("IoT") devices, virtual reality or augmented reality devices, and the like. Each client device 102 may optionally include one or more data stores (not shown in FIG. 1) including various applications or computer-executable instructions, such as web browsers or media player software applications, used to implement the embodiments disclosed herein. Client devices 102 may further include additional hardware or software components that can be utilized to capture contextual information, such as environmental sensors (e.g., temperature sensors).

Further, the content delivery environment 100 includes a network service 160. The network service can be used to process content requests, personalize the content requests, and provide a set of responsive personalization content. The network service 160 includes a request service 120. The request service is configured to interface with the client devices 102 in order to receive content requests. Each content request from the client device 102 to the request service 120 includes an entity identifier and context information identifying one or more situational criteria for evaluation and selection of personalization information.

The network service 160 further includes a personalization component 130. The personalization component receives the content request from the request service. The personalization component 130 includes an offline personalization component 132 which receives the entity identifier and retrieves offline personalization information based on the entity identifier. The offline personalization is a predetermined or pre-calculated personalization responsive to an entity identifier and independent of the context information. The offline personalization information can include but is not limited to past browsing history, past searches, past streams, past interests, past purchases, past selections, past device settings, subscriptions, and watchlist information.

The past device settings can include but is not limited to language settings, volume settings, and screen resolution settings.

The personalization component 130 further includes a situational personalization component 134 which receives both entity identifier and context information and produces a situational personalization based on the entity identifier and context information. In some embodiments, the context information includes one or more of time of day, weather information, location information, client device information (e.g., hardware configuration or software configuration), current browsing history, current purchases, current selections, current device settings, and point of request. In some embodiments, the client device information includes one or more of client device screen size, client device language setting, client device volume setting, and client device notification setting. The personalization component 130 further includes an offline personalization storage component 136 for maintaining offline personalization information associated with the entity identifier.

The personalization component 130 further includes a personalization model execution component 138 which receives personalization models associated with individual entity identifiers. The personalization model can include but is not limited to one or more weighted decision trees and one or more neural networks. The personalization models include information for determining whether one or both of the offline personalization information or situational personalization information is responsive to evaluation of context information. The personalization model can be calculated a priori to determine how personalization opportunities will be allocated between the offline personalization information and the situational personalization information. The personalization model execution component 138 executes the personalization model with the offline personalization information and the situational personalization information to form a set of responsive content. The personalization model execution component 138 transmits the formed set of responsive content responsive to the request service. An illustrative embodiment of the personalization model execution component 138 is depicted in FIG. 2.

The personalization model execution component 138 uses both offline personalization information and situational personalization information to execute the model instead of computing personalization completely at run time. Offline personalization information is stored rather than computed at run time and therefore this process saves run time processing and speeds up processing. Offline personalization information can be predetermined because it can be calculated without dependency on context information. In some embodiments, the personalization model execution component 138 further includes a specification of at least one exception to the personalization model in order to override the model. The exception to the personalization model executes the personalization model with at least one of the situational personalization and offline personalization utilizing the at least one exception in lieu of the at least one of situational personalization and offline personalization to form a set of responsive content.

The network service 160 further includes a model service 140. The model service 140 is used to maintain, transmit, and update personalization models. Illustratively, the model service 140 includes a model management component for processing requests for personalization models and model storage 144 for storing personalization models based on entity identifier. The model service 140 further includes a model update component 144 which receives personalization models associated with individual entity identifiers, evaluates the personalization models based on feedback data and the formed set of responsive content, update the personalization models based on the evaluation, and send the updated personalization model to the model storage 148. The model service 140 includes a model delivery component 146 which receives the entity identifier from the request service 120, retrieves the corresponding personalization model from the model storage 148 and sends the model to the personalization model execution component 138. The request service 120 finally delivers the set of responsive content to the one or more client devices 102.

Figure 2:
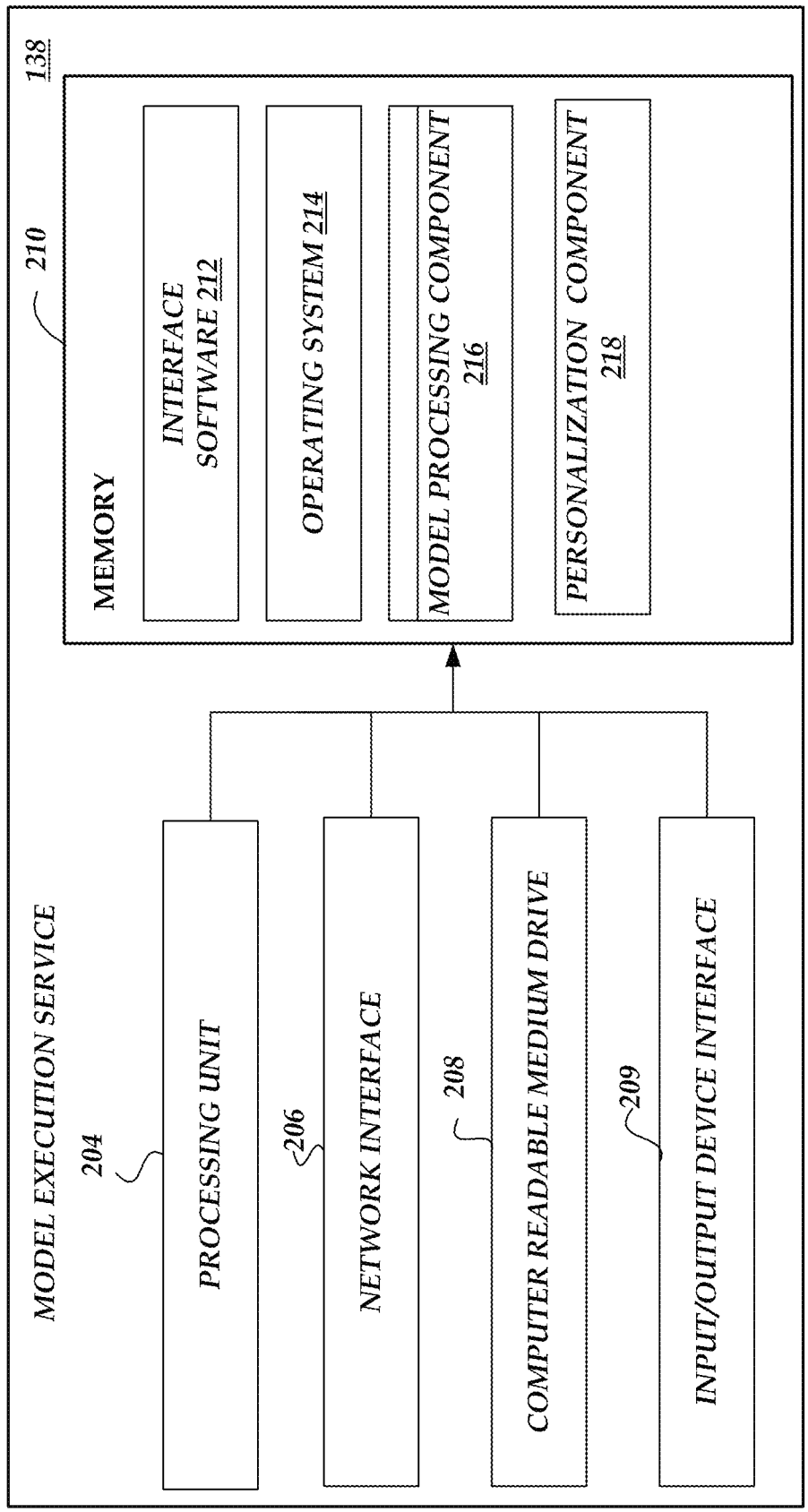
FIG. 2 is a block diagram of illustrative components of a personalization model execution component configured to execute personalization models with offline personalization information and situational personalization information in accordance with an illustrative embodiment.

FIG. 2 depicts one embodiment of an architecture of an illustrative server for functioning as a personalization model execution component 138 configured to execute personalization models with offline personalization information and situational personalization information. The general architecture of the personalization model execution component 138 depicted in FIG. 2 includes an arrangement of computer hardware and software components that may be used to implement aspects of the present disclosure. As illustrated, the personalization model execution component 138 includes a processing unit 204, a network interface 206, a computer readable medium drive 208, and an input/output device interface 209, all of which may communicate with one another by way of a communication bus.

The network interface 206 may provide connectivity to one or more networks or computing systems, such as the network 110 of FIG. 1 and the content delivery service 150 or client devices 102. The processing unit 204 may thus receive information and instructions from other computing systems or services via a network. The processing unit 204 may also communicate to and from memory 210. The input/output device interface 209 may also accept input from the optional input device 224, such as a keyboard, mouse, digital pen, etc. In some embodiments, the user computing device 102 may include more (or fewer) components than those shown in FIG. 2.

The memory 210 may include computer program instructions that the processing unit 204 executes in order to implement one or more embodiments. The memory 210 generally includes RAM, ROM, or other persistent or non-transitory memory. The memory 210 may store interface software 212 and an operating system 214 that provides computer program instructions for use by the processing unit 204 in the general administration and operation of the personalization model execution component 138. The memory 210 may further include computer program instructions and other information for implementing aspects of the present disclosure. For example, in one embodiment, the memory 210 includes model processing component 216 for receiving a personalization model and decoding the personalization model for execution. Additionally, in some embodiments, the memory 210 includes a personalization generator 218 which executes the personalization model to generate the set of responsive content.

Figure 3:
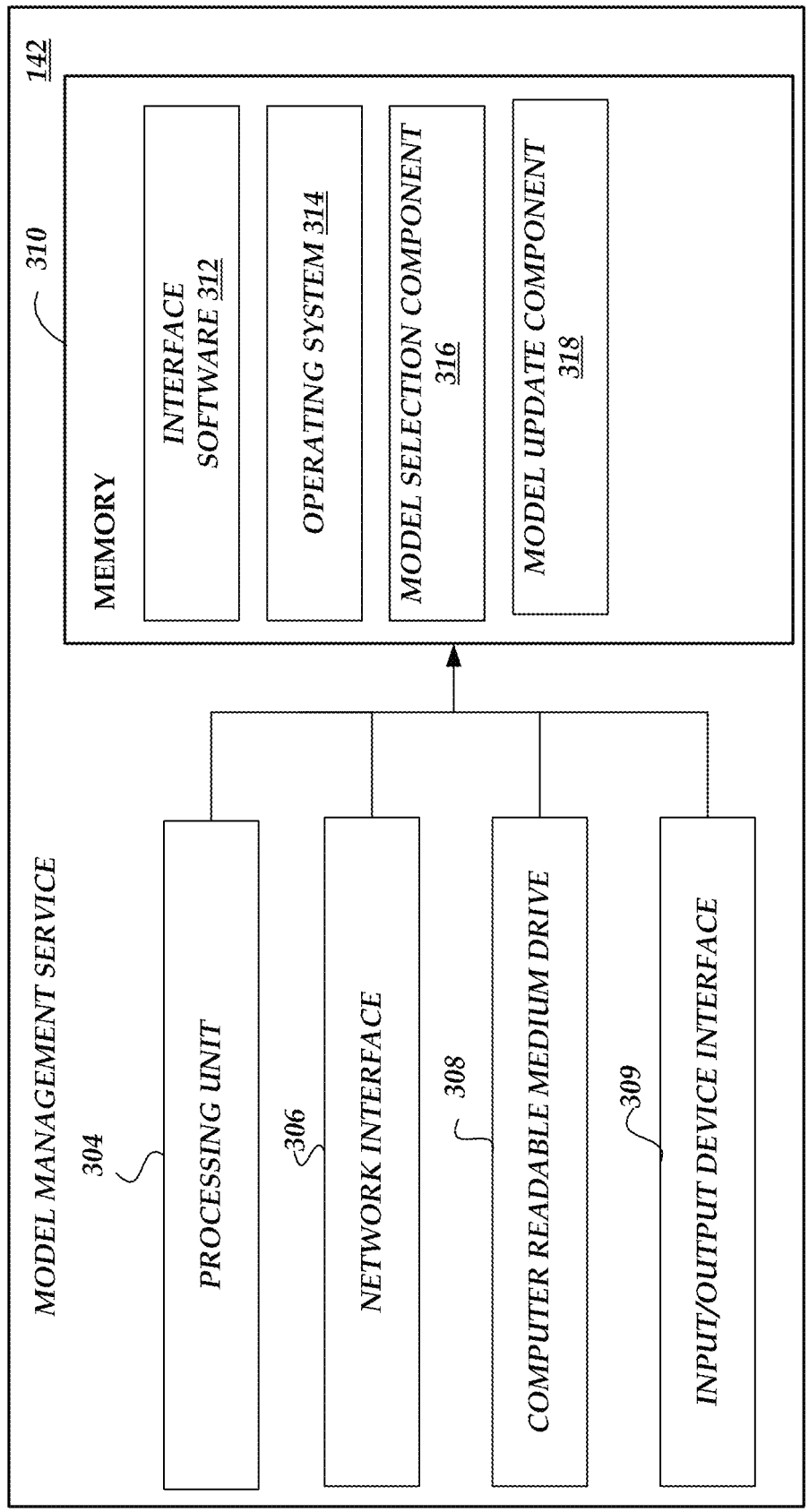
FIG. 3 is a block diagram of illustrative components of a model management component configured to manage personalization models based on feedback data in accordance with an illustrative embodiment.

FIG. 3 depicts one embodiment of an architecture of an illustrative server for functioning as a model management component or service 142 configured to update personalization models based on feedback data. The general architecture of the model management component or service 142 depicted in FIG. 2 includes an arrangement of computer hardware and software components that may be used to implement aspects of the present disclosure. As illustrated, the model management component or service 142 includes a processing unit 304, a network interface 306, a computer readable medium drive 308, and an input/output device interface 309, all of which may communicate with one another by way of a communication bus.

The network interface 306 may provide connectivity to one or more networks or computing systems, such as the network 110 of FIG. 1 client devices 102. The processing unit 304 may thus receive information and instructions from other computing systems or services via a network. The processing unit 304 may also communicate to and from memory 310. The input/output device interface 309 may also accept input from the optional input device 324, such as a keyboard, mouse, digital pen, etc. In some embodiments, the user computing device 102 may include more (or fewer) components than those shown in FIG. 3.

The memory 310 may include computer program instructions that the processing unit 304 executes in order to implement one or more embodiments. The memory 310 generally includes RAM, ROM, or other persistent or non-transitory memory. The memory 310 may store interface software 312 and an operating system 314 that provides computer program instructions for use by the processing unit 304 in the general administration and operation of the model update component 144. The memory 310 may further include computer program instructions and other information for implementing aspects of the present disclosure. For example, in one embodiment, the memory 310 includes model selection processing component 316 for selecting personalization models based on identifier. Additionally, in some embodiments, the memory 310 includes a model update component 318 generates an updated personalization model based on the processed feedback data.

Figure 4:
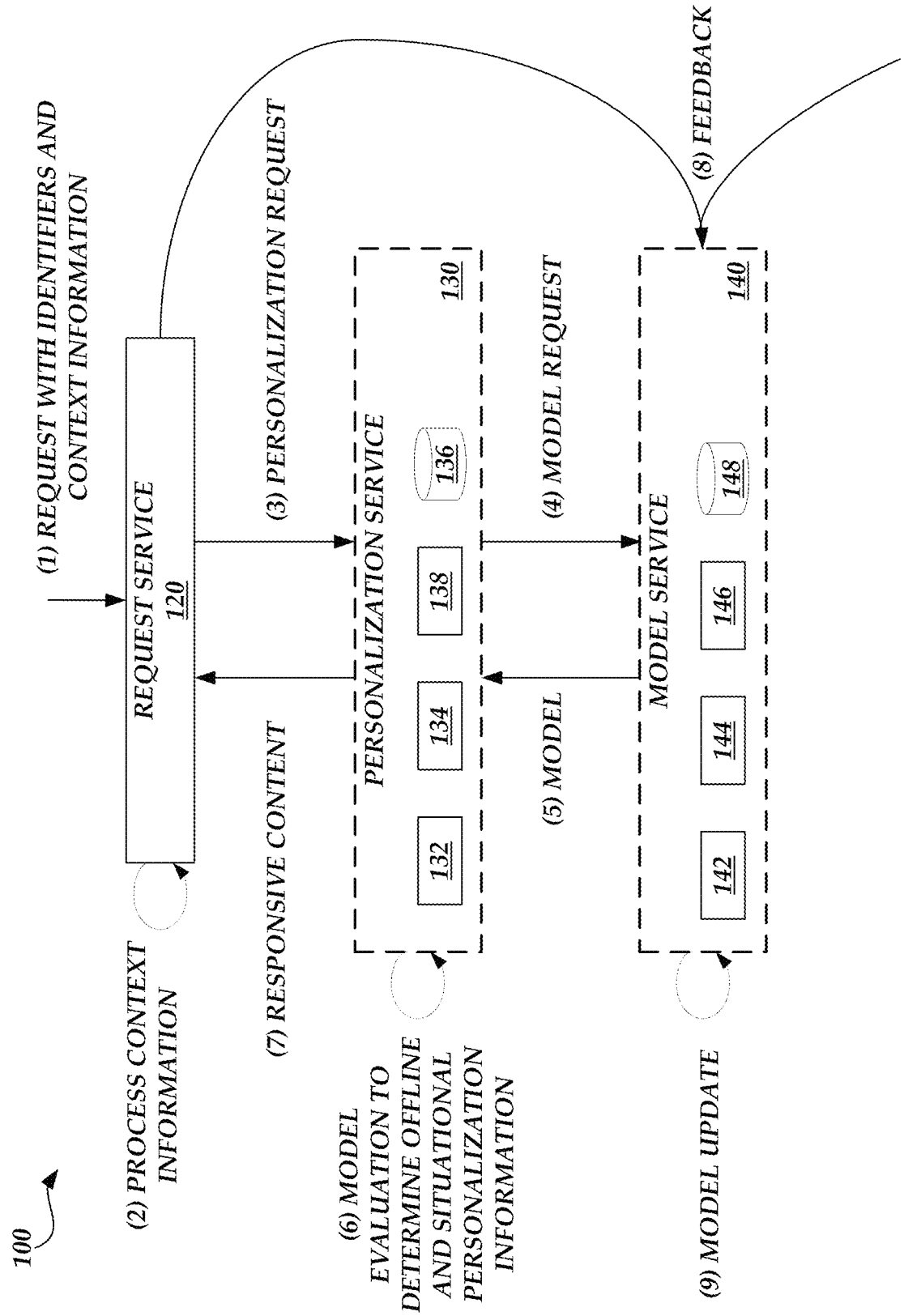
FIG. 4 is a block diagram of the content personalization environment of FIG. 1 illustrating the personalization of content based on offline personalization information, situational personalization information, and a personalization model.

FIG. 4 depicts a block diagram of an illustrative embodiment of the content delivery environment 100 of FIG. 1 illustrating the interaction between the request service 120, the personalization service 130, and the model service 140.

At (1), the request service 120 receives a content request that includes an entity identifier and context information. The context information can include time of day, weather, location, client device information, current browsing history, current purchases, current selections, current device settings, and/or point of request. Point of request is defined as the point where the request is entered from. The current device settings can include but is not limited to language settings, volume settings, and screen resolution settings. Illustratively, when the language setting is set to English a user is likely not responsive to a set of content in the language of French. Therefore, context information can provide insight into a user's preferences. A further example is if a user enters a content request from a point of request of an American football website. This point of request would show that the user is likely responsive to other American football content.

At (2), the request service 120 gets additional context information. The additional context information is information that is readily apparent to the request service without communication with the client device 102. The additional context information can include information such as time of day and date. At (3), the request service 120 transmits the request to the personalization service 130. At (4), the personalization service 130 transmits a model request which includes the entity identifier to the model service 140.

At (5), the model service 140 transmits a personalization model based on the entity identifier to the personalization service 130. The personalization model can be used to determine at least one of the offline personalization information and the situation personalization information is responsive to a specific entity identifier and context information to form a set of responsive content. The personalization models can be but are not limited to one or more weighted decision trees and one or more neural networks. The personalization model can be unique to an individual or alternatively can correspond to a group of individuals. The personalization model is determined prior to the content request and can be updated based on feedback data, such as explicit user feedback, implicit feedback, performance data, and the like.

Illustratively, in the case of when a personalization model is unique to an individual, if a user in the past tends to choose content based with a bias towards the current weather, the personalization model would give more weight to this personalization information. Alternatively, if the user in the past shows no preference for content based on the device screen size, the personalization model would give less weight to the device screen size personalization information.

The personalization service 130 retrieves offline personalization information based on the entity identifier and generates situational personalization information based on the entity identifier and the context information. Context information can be received from but not limited to the client devices and request service. Context information can be but not limited to request contextual, session contextual, and business contextual. Examples of request-contextual context include time of day, device settings, device attributes, and language settings. Examples of session-contextual context include free trial (FT), hard offer (HO), student HO, or point of request. Examples of business-contextual context include real-time offers and live events.

Offline personalization information can be determined prior to the receipt of the content request and can be determined without requiring dependence on context information. Examples of offline personalization information are past browsing history, past purchases, past selections, past device settings, subscriptions, and watchlist information. Illustratively, past browsing history has already occurred and does not change dependent on context information. Therefore, past browsing history can be preprocessed into the offline personalization information which saves runtime processing.

At (6), the personalization service 130 executes the personalization model with the offline personalization information and situational personalization information in order to generate a set of responsive content. The personalization service executes the personalization model by determining at least one of offline personalization information and situational personalization information response to a specific entity identifier and context information to form a set of responsive content. The entity identifier be unique to identifiable individuals, accounts, specific client devices, software applications, networks or organizations, combinations thereof, and the like.

The personalization model can be executed using one or more weighted decision trees and/or one or more neural networks. Illustratively, the personalization models may be encoded in a variety of executable formats that can be evaluated to identify personalization information formed from the offline personalization information and situational personalization information. For example, the personalization model in the form of a weighted decision tree may be encoded according to one of a variety of programming languages, such as JSON, XML, binary, CSV, or other programming languages or computer-readable instructions. In another example, the personalization model in form of a neural network may be encoded with metadata or other configuration information that facilitates the execution of the neural network to generate the processing results. In both embodiments, the personalization model may be implemented in accordance with a set of components that facilitate the execution of the personalization model, such as interpreters, compilers, virtual machine instances, hardware components, and the like. Other forms of machine learning or decision making algorithms, including combination of such models, could also be implemented in accordance with aspects of the present application. The personalization model can further be configured to execute an override where at least one exception to the personalization model is executed. When an override is executed, the at least one exception is used in lieu of the at least one of situational personalization and offline personalization to form a set of responsive content. As described above, the selection of offline personalization information can determine the amount of situational personalization information that will be utilized to form the set of responsive content. For example, assume that a personalization model for a first entity is configured such that personalization information is more dependent on temperature than a personalization model for a second entity. Accordingly, execution of the first personalization model would likely include more situational personalization information based on fluctuations in temperature (e.g., a user having a preference/sensitivity for lower temperatures will likely be interested in fans if temperature contextual information is indicative of an increase in temperature. Still further, the execution of the second personalization model would likely include offline personalization information for certain ranges of temperatures indicative of a lack of dependence/influence on temperature criteria. However, at some threshold amount of temperatures, both the first and second personalization models would indicate a reliance on situational personalization information (e.g., an extreme cold or heatwave).

At (7), the set of responsive content is delivered to the request service 120.

Further, the request service transmits the set of responsive content to the client devices 102. Also, the request service can monitor the client device's selection based on the set of responsive content in order to obtain user feedback data.

At (8), the feedback data can be transmitted to the model service 140 for updating the personalization model. Examples of feedback data include click through rate, partial sign-up rate, and full sign-up rate. Illustratively, if a user is set of responsive content with the three choices of a horror film, a comedic film, and a romantic film and chooses the romantic film, the model service can use this feedback data to update the personalization model associated with that user to include more romantic films in the user's responsive content. Illustratively, the feedback data can include explicit user feedback, implicit feedback related to performance information of the personalization information (e.g., time spent accessing an interface or the selection of specific objects or selection of content streams), and the like. At (9), the model management component 142 processes and update the personalization model. For example, the personalization model may cause execution of the machine learning algorithm to update the personalization models, such as by the incorporation of penalty or reward data.

Figure 5:
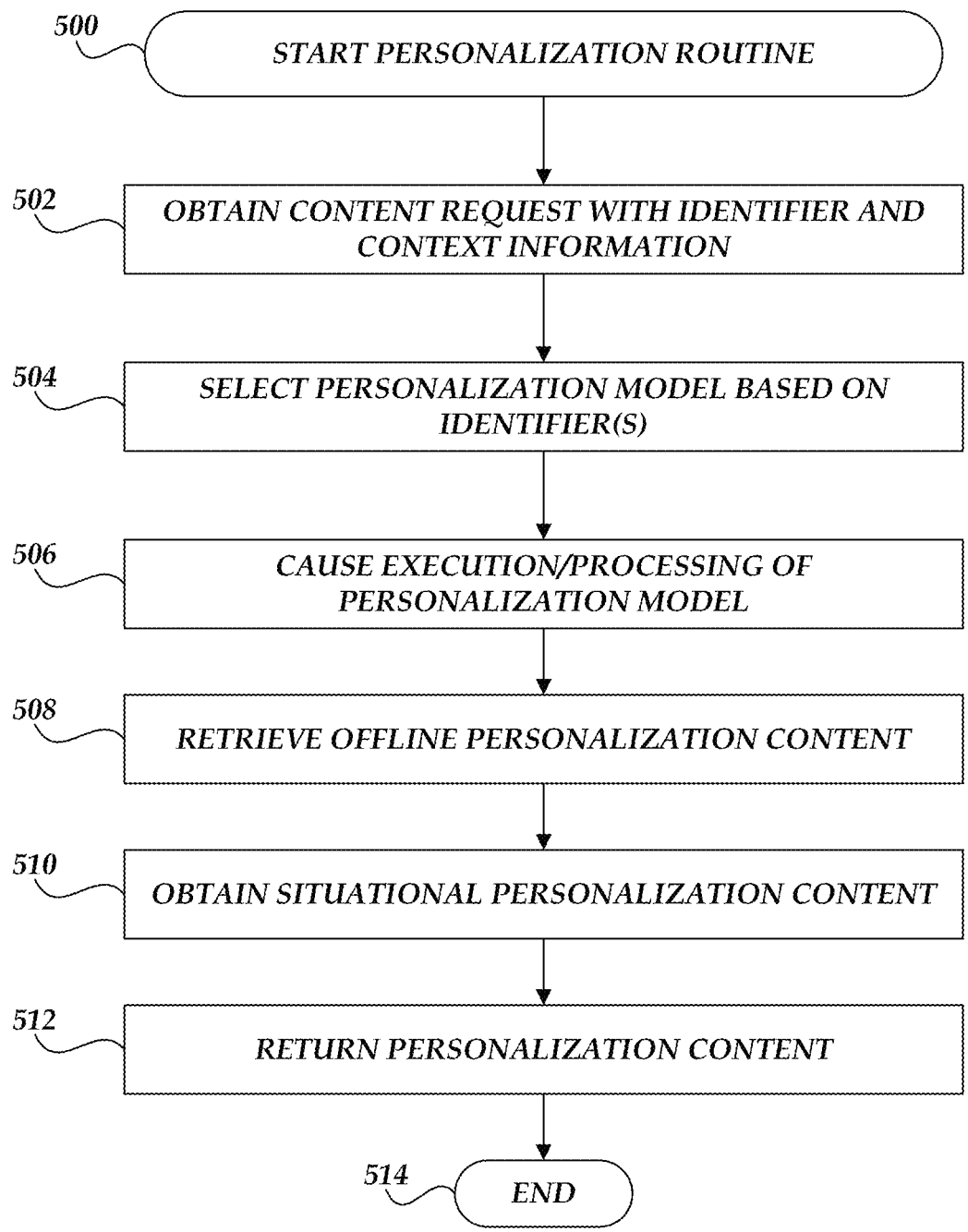
FIG. 5 is a flow diagram illustrative of a content personalization routine implemented by a personalization model execution component.

FIG. 5 is a flow chart depicting a content personalization routine 500 implemented by the personalization model execution component 138. Illustratively, Routine 500 will be described with regard to implementation on a personalization model execution component 138. However, a skilled artisan would understand that routine 500 could be implemented on any computing device. Routine 500 is described herein at a point in which the offline personalization information has been precomputed or predetermined according to offline contextual information as described herein. Additionally, routine 500 is described with regard to the predetermination or dynamic determination of the personalization models that will be evaluated. The offline personalization information and personalization models may be stored and maintained to be recalled with a personalization request including an entity identifier.

At block 502, the personalization model execution component 138 receives a content request which includes an entity identifier and context information. The entity identifier can be unique to an individual client device or can be common among a group of client devices. In the case where the entity identifier is unique an individual client device. Illustratively, groups such as members of an organization or a club could be assigned the same entity identifier. Generally, in the context of streaming applications, the content delivery service 150 indexes a collection of source video content (either live streaming or file-based video-on-demand) and delivers it to clients via a wide range of communication protocols such as HTTP Live Streaming ("HLS"), Dynamic Adaptive Streaming over HTTP ("DASH"), HTTP Dynamic Streaming ("HDS"), Smooth Streaming, Real Time Messaging Protocol ("RTMP"), and the like. Based on consumer demand, a video packaging and origination service can also provide advanced video transmission features such as just-in-time packaging of video content, digital rights management ("DRM") encryption, time-shifting, bitrate selection, catch up TV, and more.

At block 504, the personalization model execution component 138 selects a personalization model based on the entity identifier. The personalization model can be unique to an entity identifier or can be common among a group of entity identifiers. For example, entity identifiers can be grouped into various predetermined groups such as users that exhibit a preference for weather related activities or users that exhibit a preference for interesting food. These various predetermined groups can be given the same personalization model. In other embodiments, the personalization model execution component 138 can execute decision making logic to choose between multiple available personalization models. For example, the personalization model execution component 138 can select a personalization model if two or more identified users may be associated with a particular content request. In another embodiment, the personalization model execution component 138 can apply default or template personalization models for specific types of users. As described above, the offline personalization information can include information that is completely independent of context information (e.g., color preferences may not be dependent time of day). In other embodiments, the offline personalization information can include information that may have some dependency on context information but is processed in a manner in which the dependency is ignored or otherwise assumed (e.g., user device settings can be assumed based on a specified default device).

At block 506, the personalization model execution component 138 executes the personalization model with context information as inputs to select from at least one of the situational personalization and offline personalization to form a set of responsive content. As described above, the personalization models illustratively may be encoded in a variety of executable formats that can be evaluated to identify personalization information formed from the offline personalization information and situational personalization information. For example, the personalization model in the form of a weighted decision tree may be encoded according to one of a variety of programming languages, such as JSON, XML, binary, CSV, or other programming languages or computer-readable instructions. In another example, the personalization model in form of a neural network may be encoded with metadata or other configuration information that facilitates the execution of the neural network to generate the processing results. In both embodiments, the personalization model may be implemented in accordance with a set of components that facilitate the execution of the personalization model, such as interpreters, compilers, virtual machine instances, hardware components, and the like. Other forms of machine learning or decision making algorithms, including combination of such models, could also be implemented in accordance with aspects of the present application. In some implementations, the personalization model execution component 138 can include an override which includes an exception to the personalization model. When the personalization model is executed with an exception, the personalization model execution component forms a set of responsive content utilizing the at least one exception in lieu of the at least one of situational personalization and offline personalization to form a set of responsive content. As described above, the personalization model can be executed using one or more weighted decision trees and/or one or more neural networks. As described above, the selection of offline personalization information can determine the amount of situational personalization information that will be utilized to form the set of responsive content. For example, the personalization model can process context information as inputs that will be evaluated/processed in a manner to result in one or more pieces of personalization information. Still further, in some embodiments, the personalization model can further be configured to execute an override where at least one exception to the personalization model is executed. When an override is executed, the at least one exception is used in lieu of the at least one of situational personalization and offline personalization to form a set of responsive content.

At block 508, the personalization model execution component 138 retrieves offline personalization information based on the entity identifier. Examples of offline personalization information are past browsing history, past purchases, past selections, past device settings, subscriptions, and watchlist information. Illustratively, offline personalization information such as past browsing history is independent of context information and therefore can be predetermined. Offline personalization can be recalled rather than calculated at runtime which speeds up performance. Illustratively, the personalization model execution component 138 can be configured to process as much information as possible or at least a substantially larger portion of personalization information into offline personalization information. This allows the personalization model execution component 138 to process personalization information apriori in a manner that can be more efficient, such as processing during off-peak hours or utilizing specialized resources that may not always be readily available.

At block 510, the personalization model execution component 138 obtains a situational personalization based on the entity identifier and context information. Some examples of context information are time of day, weather, location, client device information, current browsing history, current purchases, current selections, current device settings, and point of request. Some examples of the client device information include one or more of client device screen size, client device language setting, client device volume setting, and client device notification setting. In some aspects, the personalization model execution component 138 generates the situational personalization based on the entity identifier and context information. However, the situational personalization can also be received from another component. Illustratively, context information can be indicative of a user's preferences because users with similar context information are responsive to similar content. For example, on a rainy day, the weather can make users less inclined to purchase beachwear or iced tea and more inclined to purchase raingear or hot beverages. Situational personalization is based on context information at runtime and therefore is generated at runtime. In some examples, context information is presumed and therefore situational personalization can be predetermined based on this assumption.

At block 512, the personalization model execution component 138 returns or otherwise processes the personalized content and routine 500 terminates at block 514.

In some embodiments, executing the personalization model includes evaluation of performance information of a client device. The evaluation of performance information can include evaluation of resource consumption in selecting one or both of situational personalization and offline personalization to form a set of responsive content.

Additionally, some implementations include a method for updating the personalization model based on feedback data. Feedback data can include user response to the set of responsive content (i.e. whether the user viewed content from the responsive content, how much of the viewed content the user consumed, and whether the user declined to view content after receiving the set of responsive content).

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system for management of personalization content comprising:
   one or more computing devices comprising a processor and a memory for executing the computer-executable instructions for:
     implementing a request service, the request service configured to receive content requests from individual client devices and transmit personalization requests to a personalization service separate from the individual client devices, the content requests including an entity identifier for an entity that views the requested content via the individual client device and context information identifying one or more situational criteria and identifying preferences of the entity that views the requested content for evaluation;
     implementing the personalization service including:
       an offline personalization component configured to receive the entity identifier and retrieve offline personalization information based on the entity identifier, the offline personalization being predetermined personalization information responsive to the entity identifier independent of the context information,
       a situational personalization component configured to receive both the entity identifier and the context information and produce a situational personalization based on the entity identifier and the context information,
       an offline personalization storage component for maintaining the offline personalization information associated with the entity identifier, and
       a personalization model execution component configured to receive personalization models associated with individual entity identifiers, the personalization models including information for determining at least one of offline personalization information or situational personalization information in response to evaluation of the context information, wherein the personalization model execution component is further configured to execute at least one personalization model according to the context information to determine at least one of offline personalization information and situational personalization information in response to a specific entity identifier and context information to form a set of responsive content, and transmit the formed set of responsive content responsive to the request service; and
     implementing a model service, the model service including:
       a model storage for storing personalization models based on entity identifier,
       a model update component configured to receive personalization models associated with individual entity identifiers, evaluate the personalization models based on user feedback data, update the personalization models based on the evaluation and send the updated personalization model to the model storage component, and
       a model delivery component configured to receive the entity identifier from the request service, retrieve the corresponding personalization model from the model storage, and send the model to the personalization model execution component,
     wherein the request service is further configured to transmit the set of responsive content to the individual client devices.

2. The system for management of personalization content of claim 1, wherein the context information comprises at least one of time of day, weather information, event information, location information, browsing history information, purchase information, selection information, current settings, or point of request.

3. The system for management of personalization content of claim 1, wherein the determination of at least one of the offline personalization information and the situational personalization information response to a specific entity identifier and context information further comprises the use of a weighted decision tree.

4. The system for management of personalization content of claim 1, wherein the determination of at least one of the offline personalization information and the situational personalization information response to a specific entity identifier and context information further comprises the use of one or more neural networks.

5. The system for management of personalization content of claim 1, wherein the personalization model execution component is further configured to receive a specification of at least one exception to the personalization model and execute the personalization model with at least one of situational personalization and offline personalization to form a set of responsive content including utilizing the at least one exception in lieu of the at least one of situational personalization and offline personalization to form a set of responsive content.

6. A computer-implemented method for management of personalization content comprising:
   receiving, from a client device, a content request which includes an entity identifier for an entity that views the requested content via the client device and context information identifying one or more situational criteria and identifying preferences of the entity that views the requested content for evaluation;
   selecting, from a model service separate from the client device, a personalization model based on the entity identifier;

retrieving offline personalization information based on the entity identifier, wherein the offline personalization information is predetermined;

obtaining a situational personalization based on the entity identifier and context information; and executing the personalization model according to the context information to determine an allocation of offline personalization information and situational personalization information to form a set of responsive feature data.

7. The computer-implemented method of claim 6, wherein executing the personalization model further comprises determining at least one situational personalization information responsive to the determination of the offline personalization information.

8. The computer implemented method of claim 7, wherein executing the personalization model further comprises evaluating performance information of a client device.

9. The computer-implemented method of claim 6 further comprising updating the personalization model based on feedback data.

10. The computer-implemented method of claim 6 further comprising transmitting the set of responsive content to one or more individual client devices.

11. The computer-implemented method of claim 6, wherein the executing the personalization model further comprises using a weighted decision tree to form the set of responsive content.

12. The computer-implemented method of claim 6, wherein the executing the personalization model further comprises using one or more neural networks to form the set of responsive content.

13. The computer-implemented method of claim 6 further comprising receiving a specification of at least one exception to the personalization model, wherein executing the personalization model with at least one of situational personalization and offline personalization to form a set of responsive content includes utilizing the at least one exception in lieu of the at least one of situational personalization and offline personalization to form a set of responsive feature data.

14. The computer implemented method of claim 6, wherein the context information comprises at least one of event information, network information, client device information, or software application information.

15. The computer implemented method of claim 14, wherein the client device information comprises at least one of client device screen size, client device language setting, client device volume setting, and client device notification setting.

16. The computer implemented method of claim 6, wherein the offline personalization information comprises at least one of past browsing history, past purchases, past selections, past device settings, subscriptions, and watchlist information.

17. The computer implemented method of claim 6, wherein the entity identifier corresponds to an individual client device.

18. The computer implemented method of claim 6, wherein the entity identifier corresponds to two or more client devices.

19. The computer implemented method of claim 18, wherein evaluating performance information of a client device comprises evaluating resource consumption of a client device in selecting at least one of situational personalization and offline personalization to form a set of responsive feature data.

20. A computer-implemented method for selecting content responsive to requests comprising:

receiving a content request from an entity device, the content request including an entity identifier for the entity that views the requested content via the entity device and context information identifying one or more situational criteria and identifying preferences of the entity that views the requested content;

obtaining a personalization model from a model service separate from the entity device;

evaluating the personalization model according to the context information to form a set of personalization content based on a variable selection of at least one of offline personalization information and situational personalization information, wherein the personalization model is associated with the entity identifier; and generating a response to the content request from the formed set of personalization content.

21. The computer implemented method of claim 20, further comprising updating the personalization model based on feedback data.

22. The computer-implemented method of claim 20, further comprising transmitting the set of responsive content to the entity device.

23. The computer-implemented method of claim 20, wherein the executing the personalization model further comprises using a weighted decision tree to form the set of responsive content.

\* \* \* \* \*